United States Patent [19]

Sharpe

[11] Patent Number: 5,335,541

[45] Date of Patent: Aug. 9, 1994

[54] PORTABLE APPARATUS FOR MEASUREMENT AND DISPLAY OF INTERNAL PRESSURE OF TIRES

[75] Inventor: Brian A. J. Sharpe, Ryde, England

[73] Assignee: Westland Aerospace Limited, England

[21] Appl. No.: 20,774

[22] Filed: Feb. 22, 1993

[30] Foreign Application Priority Data

Feb. 20, 1992 [GB] United Kingdom ............... 9203693

[51] Int. Cl.5 ............................................. B60C 23/02
[52] U.S. Cl. .................................... 73/146.5; 340/445
[58] Field of Search ........................ 73/146.5, 706; 364/571.01, 558; 340/445, 448; 374/143

[56] References Cited

U.S. PATENT DOCUMENTS

| | | | |
|---|---|---|---|
| 4,186,377 | 1/1980 | Barabino | 73/146.5 |
| 4,263,579 | 4/1981 | Corgan et al. | 73/146.5 |
| 4,267,546 | 5/1981 | Matsuda et al. | 73/146.5 |
| 4,308,520 | 12/1981 | Darlington | 340/58 |
| 4,845,649 | 7/1989 | Eckardt et al. | 364/571.02 |
| 4,866,982 | 9/1989 | Gault | 73/146.5 |
| 4,891,973 | 1/1990 | Bollweber et al. | 73/146.5 |
| 4,909,074 | 3/1990 | Gerresheim et al. | 73/146.4 |
| 4,918,423 | 4/1990 | Fukuyama et al. | 340/445 |
| 4,966,034 | 10/1990 | Bock et al. | 73/146.5 |
| 5,083,457 | 1/1992 | Schultz | 73/146.5 |
| 5,140,851 | 8/1992 | Hettich et al. | 73/146.5 |
| 5,228,337 | 7/1993 | Sharpe et al. | 73/146.5 |

FOREIGN PATENT DOCUMENTS 2251947 1/1992 United Kingdom .

Primary Examiner—Richard E. Chilcot, Jr.
Assistant Examiner—William L. Oen
Attorney, Agent, or Firm—Larson & Taylor

[57] ABSTRACT

Inflation pressure of an inflated article, e.g. a wheel tires 12, is measured by pressure sensing apparatus 10 located on the inflated article. Portable apparatus 20 is brought into proximity with the sensing apparatus 10 and a power signal is transmitted for the portable apparatus to energise the sensing apparatus. The portable apparatus acquires pressure data signals output by the sensing apparatus, processes these data signals and displays an inflation pressure value. The power signal and pressure data signals are transmitted by engaging a probe 24 provided as part of the portable apparatus with a cylindrical body member 13 of the sensing apparatus. A particular advantage of the portable apparatus is in acquiring and displaying inflation pressure values of aircraft undercarriage wheel tires because the aircraft power does not have to be switched on and the cockpit entered to obtain inflation pressure readings.

12 Claims, 4 Drawing Sheets

PORTABLE APPARATUS FOR MEASUREMENT AND DISPLAY OF INTERNAL PRESSURE OF TIRES

BACKGROUND OF THE INVENTION

1. Field of the Invention

This invention relates to pressure measurement apparatus and is more particularly concerned with portable apparatus which may be used external of an inflated article to acquire and display an inflation pressure value from a pressure sensing apparatus located on the article.

2. Description of the Prior Art

The task of checking wheel tire inflation pressures on multi-wheel undercarriages of large aircraft using a conventional pressure gauge connected to a tire inflation valve is a difficult and tiresome task for ground crew. Systems have been proposed which provide for pressure values output by a pressure sensor located on the wheel to be transmitted to the aircraft for display at the flight station in the aircraft cockpit. An advantage of such systems is that they allow tire pressures to be monitored by aircrew at any time during a flight operation, including when the aircraft is taxiing for takeoff and prior to landing. A disadvantage of such systems is their high cost and that tire pressure values can only be read in the cockpit so that when the aircraft is being serviced by groundcrew it is necessary for the aircraft electrical power system to be switched on and for a groundcrew member to enter the cockpit in order to read tire pressure values.

Disclosures of such systems, which display inflation pressure values internally of a vehicle, are to be found, for example in US-A-4845649; US-A-4891973, US-A-4909074; US-A-5140851 and GB-A-2251947.

US-A-4308520 discloses a tire pressure indicator having a wheel mounted pressure transponder unit and a hand-held interrogator unit which can be positioned for coupling with the transponder unit. The transponder unit returns signals to the interrogator unit in accordance with the pressure in the tire mounted on the wheel. When the tire pressure is above a predetermined safe level, a "safe" light on the interrogator is illuminated, and when the pressure is below the safe level a "low" light is illuminated. Thus, this apparatus does not provide a read-out of the tire pressure value.

One aim of the present invention is the provision of portable apparatus, such as may be held in the hand and used to acquire and display an inflation pressure value from pressure sensing apparatus located on an inflated article.

Another aim of this invention is the provision of such a portable apparatus for use in acquiring and displaying an inflation pressure value from pressure sensing apparatus located on a vehicle wheel, e.g. an aircraft undercarriage wheel, without the vehicle power system being switched on or entry having to be made into the vehicle.

SUMMARY OF THE INVENTION

Accordingly, in a first aspect the invention provides portable apparatus for acquiring pressure data signals from pressure sensing apparatus located on an inflated article and displaying an inflation pressure value, comprising a source of electrical power, power signal generator means connected with the electrical power source for outputting an electrical power signal, power signal transmission means connected for receiving the electrical power signal output by the generator means and adapted for transmitting the power signal to energise the pressure sensing apparatus when the portable apparatus is brought into proximity with the pressure sensing apparatus, pressure data signal receiver means for receiving pressure data signals output by the pressure sensing apparatus when energised, pressure data signal processor means connected for receiving pressure data signals from the receiver means and adapted for processing the pressure data signals to output a pressure value signal, and display means connected for receiving the pressure value signal from the processor means and adapted for displaying an inflation pressure value.

The means for generating the electrical power signal may comprise an oscillator which may be a sine wave generator.

In one embodiment of the invention the power signal transmission means comprises a power transmit coil provided with the portable apparatus which is brought into close proximity with a power receive coil provided with the pressure sensing system on the vehicle wheel. In this embodiment the pressure data signal receiver means comprises a capacitive electrode provided with the portable apparatus which is brought into close proximity with a similar electrode provided with the pressure sensing system and pressure data is transmitted by capacitively coupled frequency shift key (FSK) signals.

In another embodiment of the invention a power signal is transmitted from the portable apparatus to the pressure sensing system by a pair of coils, provided one with the portable apparatus and one with the pressure sensing system, and pressure data is transmitted from the pressure sensing system to the portable apparatus by frequency shift key (FSK) signals which are modulated onto the power signal. In this embodiment some compromise must be made in the coil design because the coil matching which is best suited for efficient transmission of the power signal does not provide the best match for transmission of the pressure data.

The pressure data signal processor means may comprise a modem adapted for converting FSK signal frequencies to a stream of serial data bits.

The pressure data signal processor means may further comprise a universal asynchronous receiver/transmitter which comprises serial to parallel converter means connected for receiving the stream of serial data bits and adapted for converting the stream of serial data bits to parallel form which is made available to an 8-bit latch and passed to a binary decoder for decoding and display as a three digit inflation pressure number.

In a further aspect the present invention provides apparatus for measuring and displaying inflation pressure of an inflated article including pressure sensing apparatus located on the inflated article and portable apparatus for energising the sensing apparatus and displaying inflation pressure values received therefrom, the pressure sensing apparatus comprising means for receiving a power signal transmitted by the portable apparatus, means for conditioning the power signal to provide a signal for energising pressure cell means sensing inflation pressure, means for processing signals output by the pressure cell means to obtain pressure values corrected for non-linearity and temperature effects, means for converting corrected pressure values to binary coded data, means for generating frequency shift key signals representative of the binary coded data, means for transmitting a frequency shift key modulated signal to the portable apparatus, the portable apparatus comprising a source of electrical power, means for generating an electrical power signal, means for transmitting the electrical power signal to the pressure sensing apparatus, means for receiving frequency shift key modulated signals output by the pressure sensing apparatus when energised, means for decoding the received signal, and means for displaying an inflation pressure value.

BRIEF DESCRIPTION OF THE DRAWINGS

The invention will now be further described by way of example only and with reference to the accompanying drawings in which.

DETAILED DESCRIPTION OF THE DRAWINGS

Figure 1:
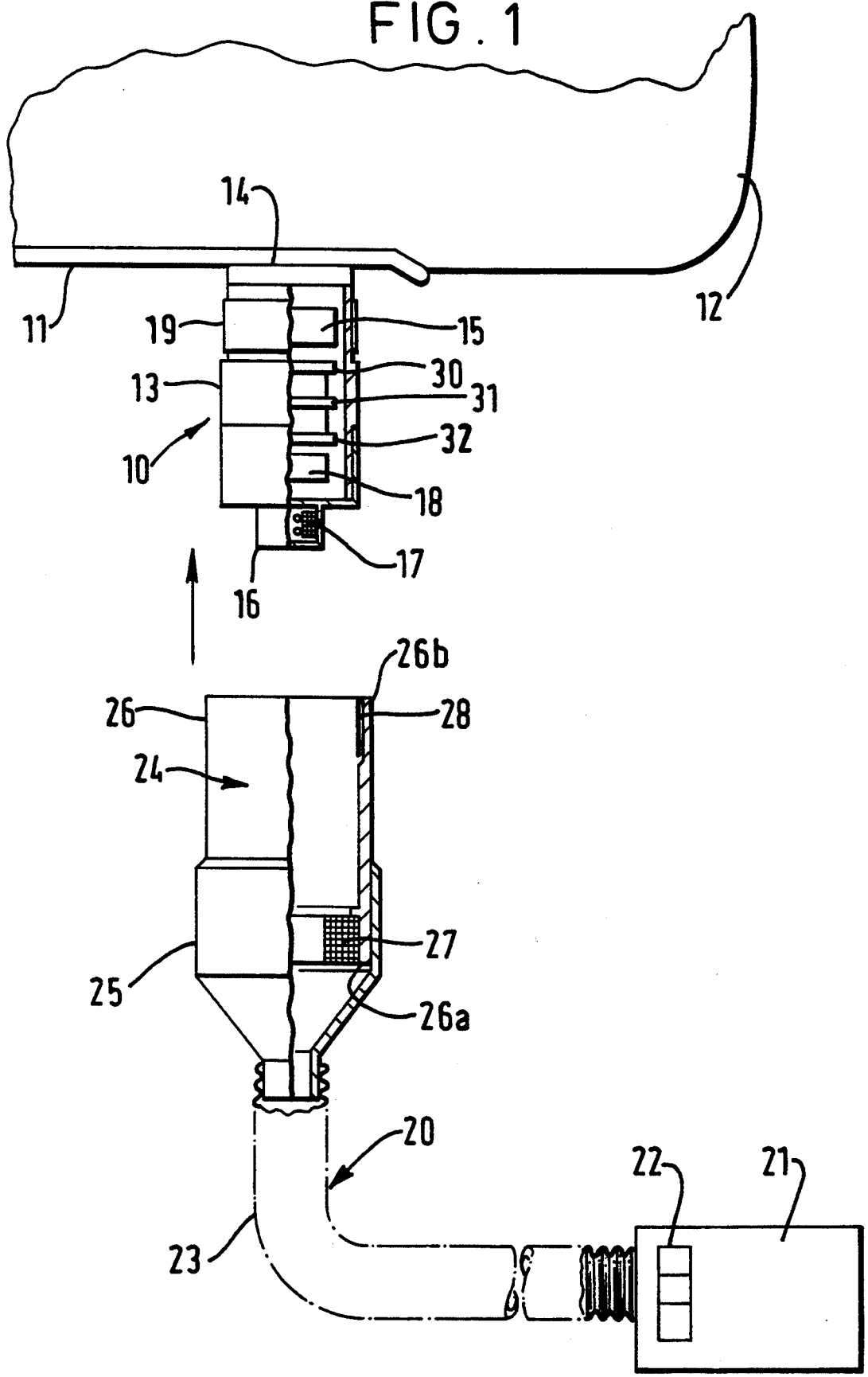
FIG. 1 is a schematic illustration of pressure measurement apparatus in accordance with one embodiment of the invention comprising portable apparatus for acquiring pressure data from tire pressure sensing apparatus located on a vehicle wheel and displaying an inflation pressure value.

Referring to FIG. 1, pressure measurement apparatus in accordance with one embodiment of the invention comprises pressure sensing apparatus 10 connected into a wheel hub member 11 carrying a pneumatic tire 12, and portable apparatus 20 for energising and reading out tire inflation pressure values from the apparatus 10.

The pressure sensing apparatus 10 comprises a hollow cylindrical body member 13 attached at one end part 14 to the hub member 11 so that pressure of gas inflating the tire 12 is sensed by a pressure cell 15 provided as part of an electronic module housed internally of the body member 13. The electronic module further comprises three printed circuit bards (PC[]) 30,31,32 which will hereinafter be described in more detail. The opposite end part 16 of the body member 13 is of reduced diameter and houses a power signal receive coil 17 which is connected to the PCB 32. A tuning capacitor 18 is connected in parallel with the coil 17. Disposed around the outer circumference of the body member 13 is a signal transmit capacitive electrode 19.

The portable apparatus 20 comprises a hand held body unit 21 having a window aperture 22 for display of a three digit pressure value. The body unit 21 houses a power source and electrical circuitry for generating a power signal which is transmitted to the pressure sensing apparatus 10, and further electrical circuitry for processing signals transmitted from the apparatus 10 to the apparatus 20. The body unit is connected by electrical wires (not shown) which run internally of a flexible conduit 23, to a probe 24 including a cup member 25. The cup member locates one end 26a of a cylindrical sleeve member 26 having an internal diameter that is a sliding fit with the major diameter of the cylindrical body member 13. Housed internally of the sleeve member 26 at its end 26a is a power transmit coil 27 having an internal diameter that is a sliding fit over reduced diameter end portion 16 of the cylindrical body member 13. Located internally of the sleeve member 26 at an opposite end 26b thereof, is a signal receive capacitive electrode 28. It will be appreciated that when the probe 23 is slid over the cylindrical body member 13 of the pressure sensing apparatus 10, the arrangement is such that the power transmit coil 27 and the signal receive capacitive electrode 28, encompass the power receive coil 17 and the signal transmit capacitive electrode 19, respectively.

The pressure sensing apparatus 10 and the portable apparatus 20 will now be further described with reference to FIGS. 2 and 3, respectively.

Figure 2:
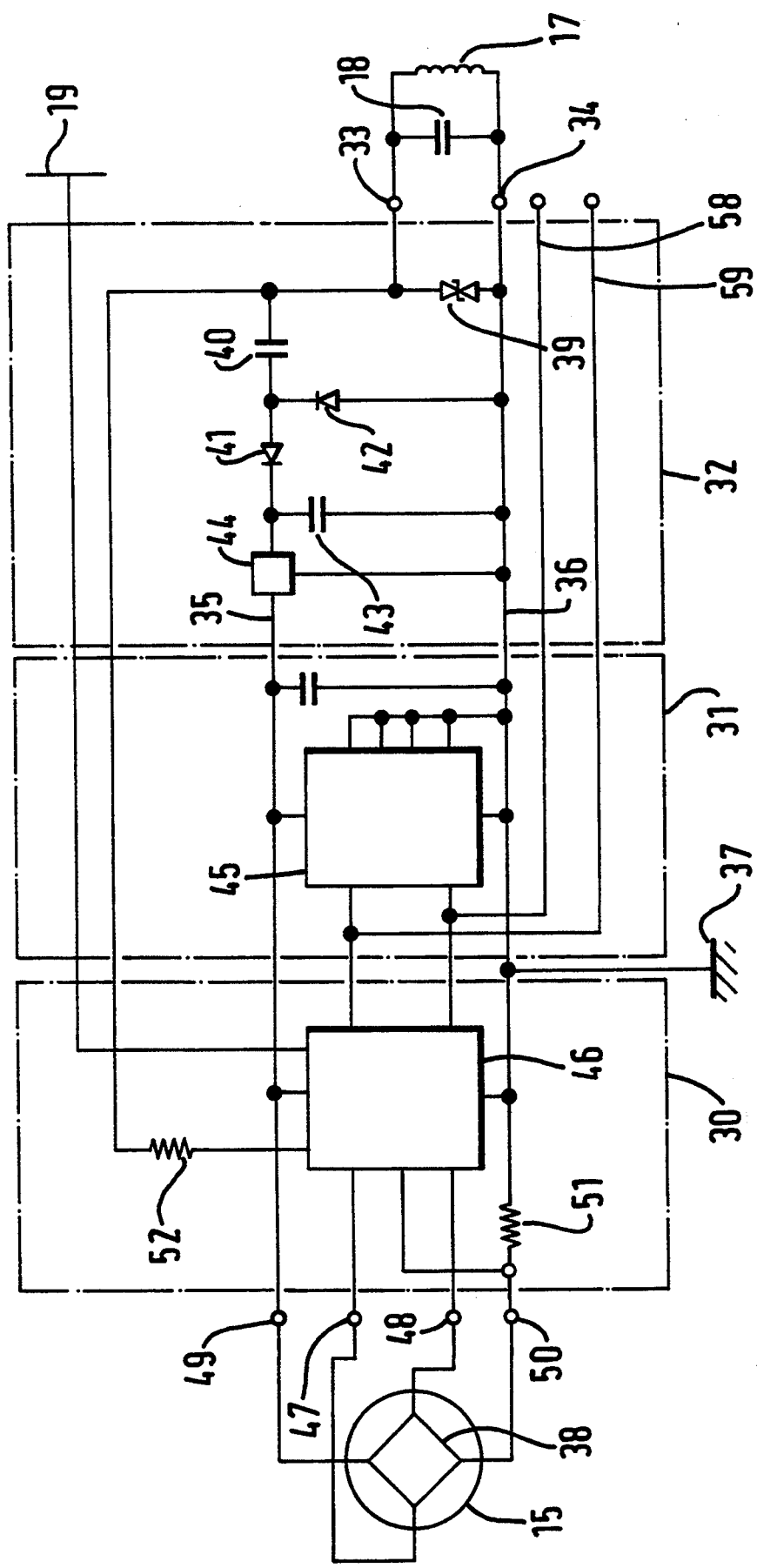
FIG. 2 is a circuit diagram of the pressure sensing apparatus shown in FIG. 1.

Referring to FIG. 2, the PCB 32 is a power signal rectification PCB which is connected for receiving a power signal from the power receive coil by pins 33, 34. The power input to the PCB 32 is protected by a bidirectional zener diode 39 and reaches the input via a capacitor 40. The power signal is rectified by two diodes 41, 42 and a capacitor 43 before being converted by a voltage regulator 44 to 5 volts d.c which is made available on a line 35 comprised by a copper wire interconnecting the PCBs 30, 31, 32. A second line 36 also interconnecting the PCBs carries 0 volts and is earthed at 37.

The PCB 31 carries an electrically-erasable-programmable-read-only memory (EEPROM) 45 which holds a 32×16 matrix look-up table that as will hereinafter be described is used to store temperature and pressure data for correcting signals output by the pressure cell 15.

In this embodiment the pressure cell 15 comprises a monolithic device in the form of a silicon wafer having a wheatstone bridge circuit 38 implanted thereon. The bridge circuit 38 is connected for energisation to lines 35 and 36 by pins 49 and 50, respectively. Voltage signals output by the bridge circuit due to imbalance are input on lines which are connected by pins 47 and 48 to an application specific integrated circuit (ASIC) 46 mounted on the PCB 30. The PCB 30 further carries resistors 51 and 52. The output of the bridge circuit 38 is non-linear and also varies with temperature. The overall resistance of the bridge is monitored by measuring the voltage across the resistor 51 which is high precision resistor that is substantially unaffected by temperature. The voltage across the resistor 51 is obtained by the ASIC 46 and using the known characteristics of the resistor the current flow through the resistor is calculated. Changes in current flow through the resistor are a measure of variations in the overall resistance of the bridge due to temperature change and, hence temperature related signals are obtained for correction purposes. The resistor 52 is a current limiting resistor which uses the power signal to provide a clock for the ASIC. The ASIC is further connected for outputting signals to the signal transmit capacitive electrode 19.

After assembly of the pressure sensing apparatus 10 the pressure cell 15 is calibrated over an operating temperature and pressure range, say −55° C. to +160° C. and 0 to 254 psi for an aircraft undercarriage wheel tire. Two voltage signals are derived, one Vp being proportional to pressure but being influenced by temperature, and the other Vt being proportional to temperature but not being substantially influenced by pressure. In order to avoid storing a large number of values that would normally be necessary to achieve the required accuracy a curve fitting method is used to define values to be written into the matrix look-up table in the EEPROM 45 using a portable computer (not shown) which is connected by a serial data line 58 and a serial clock line 59 to the EEPROM 45.

Figure 3:
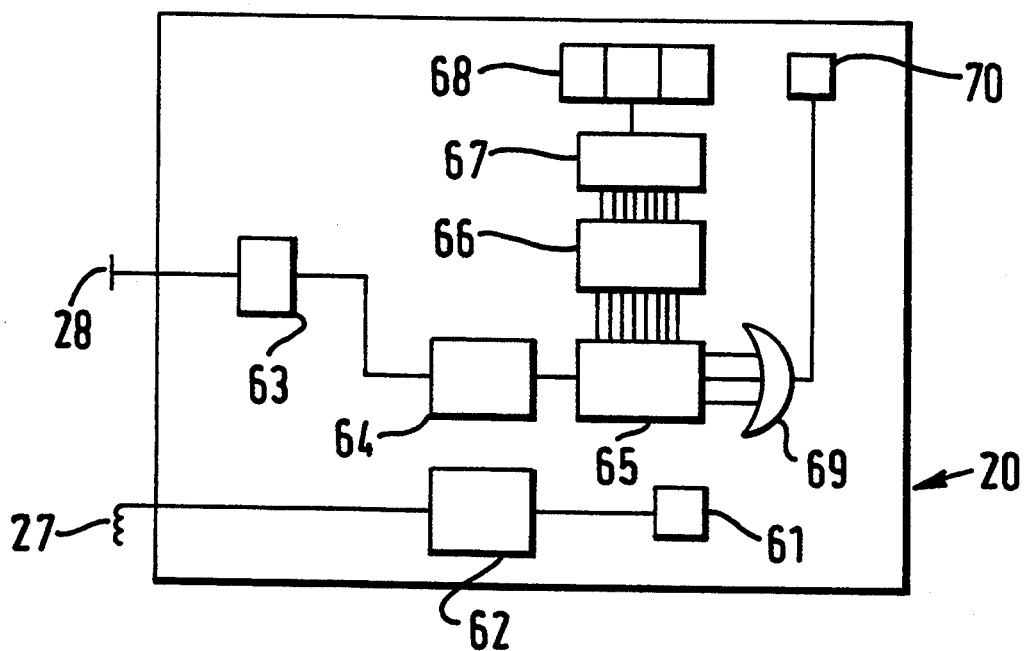
FIG. 3 is a circuit diagram of the portable apparatus shown in FIG. 1.

Referring next to FIG. 3, the portable apparatus 20 comprises a power source 61, such as a dry cell battery or a rechargeable battery, connected for delivering power to an oscillator 62 which may be a sine wave generator. The oscillator 62 is connected for outputting a power signal to the power transmit coil 27 provided as part of the probe 24. The signal receive capacitive electrode 28, also provided with the probe 23, is connected for delivering signals by way of the filter 63 to a modem 64. The modem 64 is connected with an universal asynchronous receiver/transmitter (UART) 65 which comprises a serial to parallel converter. An 8-bit latch 66 acquires data from the UART 65 and passes this data to a binary decoder 67 having an output connected to a liquid crystal or light emitting diode display which is visible through the window aperture 22 of the body unit 21. The UART 65 is further connected for passing a parity error signal, a framing error signal or a no-carrier signal, to an OR gate 69 which if either of these signals is received outputs a signal to the 8-bit latch to suppress the display and illuminate an error light 70.

In operation, the portable apparatus 20 is brought into proximity with the pressure sensing apparatus 10 on a vehicle wheel, and the probe 24 is slid over the cylindrical body member 13. The power source 61 is switched on and a power signal, in this embodiment 31.25 kHz, is output to the power transmit coil 27. This power signal is received by power receive coil 17 and, after rectification and regulation by the PCB 5 volts d.c. is made available on line 35 for energisation of the EEPROM and ASIC PCBs 31 and 30, respectively, and the bridge circuit 36 of the pressure cell 15. The bridge circuit, being unbalanced by the pressure of the gas inflating the wheel tire, outputs a voltage signal to the ASIC 46. The ASIC also acquires the voltage across the resistor 51.

The ASIC 46 reads four memory locations in the EEPROM 45 to bring down pressure and temperature gain values for an input amplifier (not shown) provided as part of the ASIC. The gain values plus their inverse values are read to validate EEPROM operation. (Prior to calibration default values are loaded into the EEPROM.) The gain is then adjusted to give full range of an analogue to digital converter (not shown) provided as another part of the ASIC, and the gain values are reloaded into the EEPROM.

The ASIC 46 next reads the differential pressure and single-ended input temperature values for a minimum of 100 samples. The polarity of inputs are reversed on alternate clock cycles in order to average out sensor and amplifier offsets. The analogue to digital converter feeds averaging logic (not shown) which outputs 1 byte of data each for temperature and pressure. These are then truncated into a 9 bit address (5 bits for temperature and 4 bits for pressure).

The 9 bit word is used to address eight locations in the EEPROM. The 8 locations are derived by incrementing the temperature portion by one bit and then the pressure portion to give a sequence of four points. This is repeated for the four inverse data locations. The data and inverse data is checked for corruption and four map points are derived. If corruption is detected an error word is passed to the signal transmit electrode 19 and no other processing is performed. If data is good, the ASIC then uses the least significant bit information for pressure and temperature to carry out a linear interpolation to calculate true pressure value.

The corrected or true pressure value is coded in three binary words for transmission to the portable apparatus 20. The three binary words W1, W2 and W3 have the same structure which is as follows:

1 start bit (logic 0)
8 data bits, with most significant bit first
1 parity bit, (data bits+parity=even)
1 stop bit, (logic 1)

The words W1, W2 and W3 are identical and have a value which represents the pressure inside the tire.

Converting corrected pressure values to binary coded data for transmission to the portable apparatus enhances the accuracy of the system and reduces the size of the portable apparatus because the data is in a form suitable for decoding in the hand held unit 21 without requirement for conversion from analogue to digital form. Also, the chances of signal corruption during transmission of the data are further reduced.

The ASIC incorporates built in tests (BITE) which check the pressure cell inputs are not short circuited to 5V, low impedance to 0V, and open circuit. The BITE also tests the EEPROM and the ASIC itself. If an error is detected this is reported by an error code in the words W1, W2 and W3. The ASIC also checks that the tire pressure is within a required range, in this embodiment 0 to 254 psi. The ASIC does not report an error for any pressure above 254 psi, instead any higher pressure is limited to 254 reading.

Examples of the data bits for words W1, W2 and W3 in the pressure range are as follows:

| Pressure psi | Decimal | Binary |
| --- | --- | --- |
| 0 | 0 | 0000 0000 |
| 1 | 1 | 0000 0001 |
| 2 | 2 | 0000 0010 |
| 253 | 253 | 1111 1101 |
| 254 | 254 | 1111 1110 |

The error code 1111 1111 is sent when the ASIC BITE detects:
a) The failure of the EEPROM test
b) A failure of the pressure cell
c) The failure of the ASIC self test.

The word is passed down to a digital frequency synthesiser provided as part of the ASIC which generates one of two frequencies. A frequency of 2225 HZ is genarated for logic 1 and a frequency of 2025 Hz is generated for logic 0. These frequencies are modulated onto a signal which is fed to the signal transmit capacitive electrode 19.

The frequency shift key (FSK) modulated signal is transmitted by capacitive coupling to the signal receive capacitive electrode 28 on the probe 24 and is passed by way of the filter 63 to the modem 64. The modem converts the frequencies to data bits which are fed in a serial stream to the UART 65. The L/ART converts the serial data to parallel form and this is acquired by the 8-bit latch 66. Eight data bits are passed to the binary decoder 67 which decodes the data and outputs a three digit pressure value to the display 68.

Figure 5:
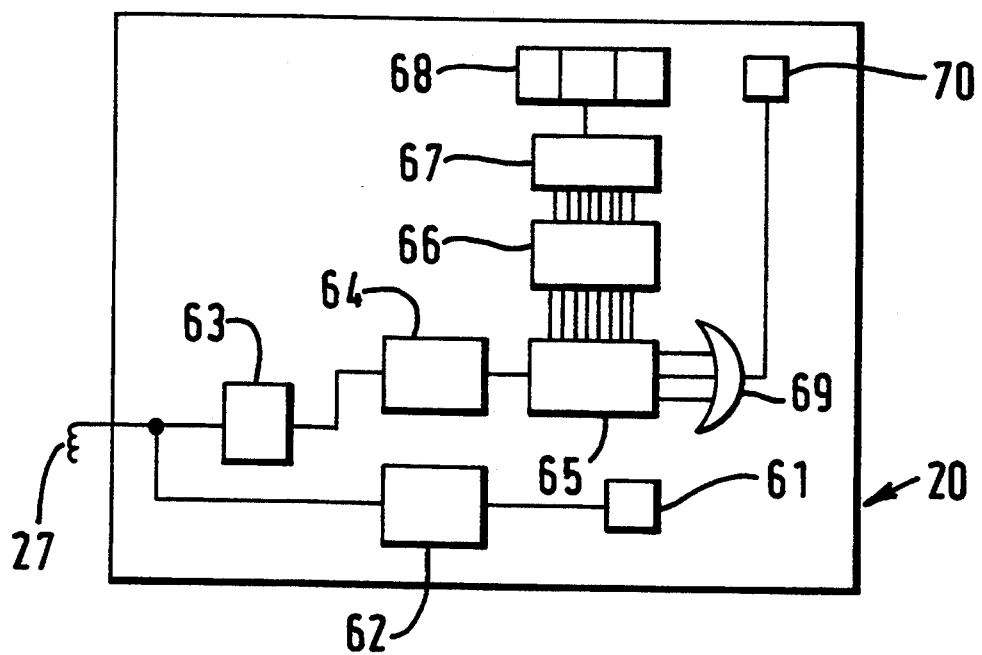
FIG. 5 is a circuit diagram of portable apparatus for use with the pressure sensing apparatus shown in FIG. 4.
Figure 4:
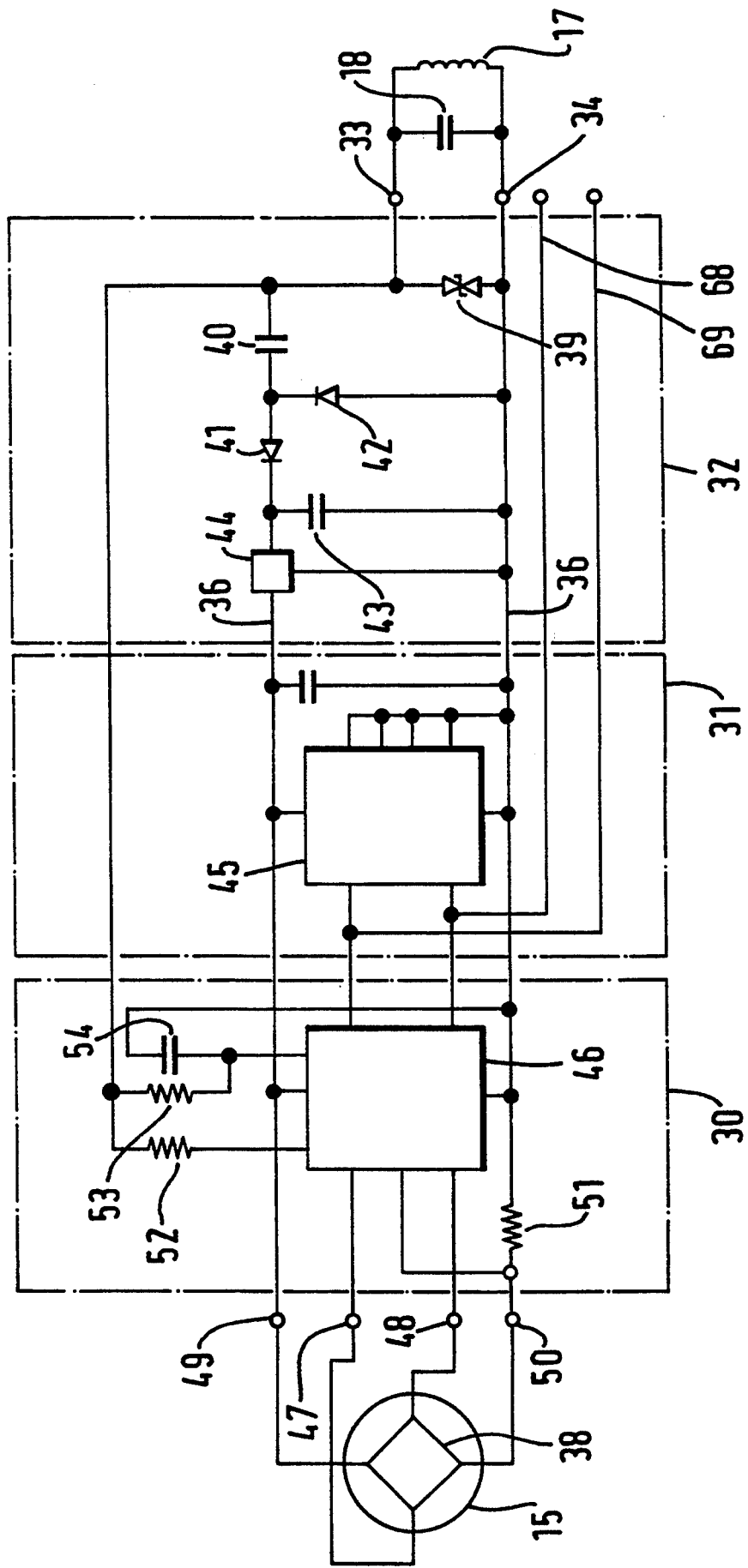
FIG. 4 is a circuit diagram of pressure sensing apparatus in another embodiment of the invention.

In another embodiment of the invention, reference FIGS. 4 and 5, corrected pressure data is transmitted from the pressure sensing apparatus to the portable apparatus by FSK signals modulated onto the power signal.

In this embodiment the signal transmit and receive capacitive electrodes are omitted which permits the probe 24 (FIG. 1) to be of reduced length. The circuit diagram for the pressure sensing apparatus 10 (FIG. 4) corresponds substantially with that for the embodiment described with reference to FIG. 2, except that the ASIC PCB 30 carries a further resistor 53 and a capacitor 54. The resistor 53 is used to modulate the FSK signals onto the power signal.

To maintain a satisfactory level of FSK modulation to pin 34 the value of resistor 53 is kept as low as possible. In order to protect the ASIC output from the high voltage power signal of coil 17, capacitor 54 acts as a filter to the power frequency.

The circuit diagram for the portable apparatus 20 (FIG. 5) corresponds substantially with that for the embodiment described with reference to FIG. 3 except that the signal receive capacitive electrode is omitted. Thus, in this embodiment, the FSK modulated signal received by the coil 27 passes to the filter 63 which filters out the power signal frequency, i.e. 31.25 kHz, and allows the 2025 Hz and 2225 Hz signals to pass to the modem 64 for conversion to data bits.

Whilst pressure measurement apparatus including portable apparatus in accordance with invention are particularly suited for use in reading out inflation pressure values from aircraft undercarriage wheel tires, it will be appreciated the apparatus can be used to sense, read out and display values from wheel tires of other vehicles or, indeed, from other inflated articles where it is required that inflation pressure be monitored.

Moreover, the invention is not limited by the two embodiments hereinbefore described with reference to and as shown in the accompanying drawings, a number of modifications being possible. For instance, provision may be made for the portable apparatus to furnish a paper print out of measured pressure data in addition to or as an alternative from the visual display. Also, the portable apparatus may include a memory in which pressure data is held for subsequent downloading such as, for example, to a computer. This is particularly advantageous when reading inflation pressures of tires on a multi-wheel aircraft undercarriage as it is more convenient to make a permanent record of pressure data in a crew room or other indoor location than at an outside location where the aircraft is standing.

What is claimed is:

1. Portable hand held apparatus for energizing discrete pressure sensing apparatus located on an inflated article, receiving a pressure signal output by the pressure sensing apparatus when energized and displaying an inflation pressure value; the portable hand held apparatus comprising an electrical power source, power signal generator means connected with the electrical power source, power signal transmission means connected with the power signal generator means and adapted for transmitting a power signal to energize the discrete pressure sensing apparatus when the hand held portable apparatus is brought into proximity with the pressure sensing apparatus, pressure signal receiver means for receiving a pressure signal output by the pressure sensing apparatus when energized, pressure signal processor means connected with the receiver means and adapted for processing the pressure data signals, and display means connected with the pressure signal processor means and adapted for displaying an inflation pressure value.

2. Apparatus according to claim 1, wherein the power signal generator means comprises an oscillator.

3. Apparatus according to claim 2, wherein the oscillator comprises a sine wave generator.

4. Apparatus according to claim 1, wherein the power signal transmission means comprises a power transmit coil provided with the portable apparatus.

5. Apparatus according to claim 4, wherein the pressure data signal receiver means comprises a capacitive electrode.

6. Apparatus according to claim 1, wherein the power signal transmission means and the pressure data signal receiver means comprises a common coil adapted when placed in proximity with a coil provided with the pressure sensing apparatus to transmit the power signal to said apparatus and to receive pressure data signals modulated onto the power signal.

7. Apparatus according to claim 1, wherein the pressure data signal processor means comprises a modem adapted for converting frequency shift key signal frequencies to a stream of serial data bits.

8. Apparatus according to claim 7, wherein the processor means further comprises a universal asynchronous receiver/transmitter connected for receiving the stream of serial data bits from the modem and adapted for converting the stream of serial data bits to parallel form.

9. Apparatus according to claim 8, wherein the processor means further comprises an 8-bit latch connected for receiving the data bits in parallel form and adapted for passing the parallel form data bits to a binary decoder for decoding and subsequent display by display means as a three digit inflation pressure number.

10. Apparatus for the measurement and display of pressure internal of an inflated article, including pressure sensing apparatus located on the inflated article and portable hand held apparatus for energizing the sensing apparatus, receiving signals output by the pressure sensing apparatus when energized, and displaying inflation pressure values received therefrom;

the pressure sensing apparatus comprising pressure cell means located on the inflated article for sensing pressure internal thereof, power signal receiver means for receiving a power signal transmitted by the portable hand held apparatus, power signal conditioning means connected with the receiver means for conditioning the received power signal and for outputting a signal suitable for energizing the pressure cell means, pressure signal processing means connected with the pressure cell means for receiving and processing signals output by the pressure cell means and for outputting pressure signals corrected for non-linearity and temperature effects, conversion means connected with the processing means for converting corrected pressure signals to binary coded data, frequency shift-key (FSK) signal generator means connected with the conversion means for generating FSK signals representative of the binary coded data, and transmission means connected with the FSK signal generator means for transmitting FSK modulated signals to the portable hand held apparatus;

the portable hand held apparatus comprising an electrical power source, electrical power signal generator means connected with the electrical power source, means connected with the generator means for transmitting an electrical power signal to the pressure sensing apparatus, signal receiver means for receiving FSK modulated signals output by the pressure sensing apparatus when energized, decoder means for decoding the FSK modulated signals, and display means connected with the decoder means for displaying an inflation pressure value.

11. Apparatus according to claim 10, wherein the electrical power signal transmitting means comprises a power transmit coil located on a probe which is adapted for engagement with a body portion of the pressure sensing apparatus so as to bring the power transmit coil into proximity with a power receive coil comprising the power signal receiving means of the pressure sensing apparatus.

12. Apparatus according to claim 11, wherein the signal receiving means comprises a signal receive capacitive electrode located on the probe so as to be brought into proximity with a signal transmit capacitive electrode comprising the signal transmitting means of the pressure sensing apparatus, when the probe is engaged with the body portion of the pressure sensing apparatus.

* * * * *